(12) United States Patent
Lin et al.

(10) Patent No.: US 7,765,020 B2
(45) Date of Patent: Jul. 27, 2010

(54) GRAPHICAL USER INTERFACE FOR PRESENTING MULTIVARIATE FAULT CONTRIBUTIONS

(75) Inventors: Y. Sean Lin, Irvine, CA (US); Alexander T. Schwarm, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 280 days.

(21) Appl. No.: 11/800,462

(22) Filed: May 4, 2007

(65) Prior Publication Data

US 2008/0276136 A1    Nov. 6, 2008

(51) Int. Cl.
*G06F 19/00* (2006.01)
*G06F 11/00* (2006.01)

(52) U.S. Cl. .................. 700/108; 700/110; 702/185; 714/25; 714/57

(58) Field of Classification Search ............ 700/80, 700/108–111, 121; 702/84–85, 179, 181–185; 370/221; 709/214; 714/25, 27, 56, 57
See application file for complete search history.

(56) References Cited

U.S. PATENT DOCUMENTS

| | | | |
|---|---|---|---|
| 5,442,562 A | 8/1995 | Hopkins et al. | |
| 5,544,308 A | 8/1996 | Giordano et al. | |
| 5,694,401 A | 12/1997 | Gibson | |
| 6,202,181 B1 | 3/2001 | Ferguson et al. | |
| 6,560,736 B2 | 5/2003 | Ferguson et al. | |
| 6,625,688 B1 | 9/2003 | Fruehling et al. | |
| 6,678,569 B2 | 1/2004 | Bunkofske et al. | |
| 6,868,342 B2 * | 3/2005 | Mutter | 702/21 |
| 6,907,545 B2 | 6/2005 | Ramadei et al. | |
| 6,954,883 B1 | 10/2005 | Coss, Jr. et al. | |
| 6,954,884 B2 | 10/2005 | Dean et al. | |
| 7,062,411 B2 | 6/2006 | Hopkins et al. | |
| 7,072,794 B2 | 7/2006 | Wittkowski | |
| 7,079,677 B2 | 7/2006 | Tai et al. | |
| 7,089,154 B2 | 8/2006 | Rasmussen et al. | |
| 7,151,976 B2 | 12/2006 | Lin | |

(Continued)

OTHER PUBLICATIONS

"Case Study: Automated Fault Detection and Diagnostic Software", New Buildings Institute, http://www.archenergy.com/pier-fdd/market_connection/Proj7_Deliverables/FD-DAlgorthimsCaseStudyFinal.pdf. 4 pages, Apr. 17, 2007.

(Continued)

*Primary Examiner*—Albert DeCady
*Assistant Examiner*—Douglas S Lee
(74) *Attorney, Agent, or Firm*—Blakely, Sokoloff, Taylor & Zafman LLP

(57) ABSTRACT

Methods and apparatuses for presenting multivariate fault contributions in a user interface are described. A user interface is provided to illustrate a fault for a sample manufactured by a process containing multiple variables, each having at least two components. The user interface presents one group of components of the multiple variables in a first axis and a second group of components of the multiple variables in a second axis and graphically illustrates contributions to the fault associated with the multiple variables by associating a contribution of each component in the one group of components of the multiple variables to each corresponding component in the second group of components of the multiple variables.

26 Claims, 10 Drawing Sheets
(6 of 10 Drawing Sheet(s) Filed in Color)

U.S. PATENT DOCUMENTS

| | | | |
|---|---|---|---|
| 7,413,546 B2* | 8/2008 | Agutter et al. | 600/485 |
| 7,587,296 B2 | 9/2009 | Harvey, Jr. et al. | |
| 7,596,718 B2 | 9/2009 | Harvey, Jr. et al. | |
| 2002/0143472 A1* | 10/2002 | Mutter | 702/20 |
| 2003/0109951 A1* | 6/2003 | Hsiung et al. | 700/108 |
| 2003/0225466 A1 | 12/2003 | Yulevitch et al. | |
| 2004/0002842 A1* | 1/2004 | Woessner et al. | 703/11 |
| 2004/0024543 A1* | 2/2004 | Zhang et al. | 702/32 |
| 2004/0110310 A1 | 6/2004 | Sun et al. | |
| 2004/0210850 A1* | 10/2004 | Bermudez et al. | 715/848 |
| 2004/0254762 A1 | 12/2004 | Hopkins et al. | |
| 2005/0010117 A1* | 1/2005 | Agutter et al. | 600/484 |
| 2005/0060103 A1 | 3/2005 | Chamness | |
| 2005/0114743 A1 | 5/2005 | Moorhouse | |
| 2006/0111804 A1 | 5/2006 | Lin | |
| 2006/0149990 A1 | 7/2006 | Veena et al. | |
| 2006/0184264 A1* | 8/2006 | Willis et al. | 700/108 |
| 2007/0006037 A1 | 1/2007 | Sargusingh et al. | |
| 2007/0021859 A1* | 1/2007 | Lev-Ami et al. | 700/121 |
| 2007/0038418 A1 | 2/2007 | Ahn et al. | |

OTHER PUBLICATIONS

Office Action for U.S. Appl. No. 11/800,461, mailed Jul. 3, 2008.
Office Action for U.S. Appl. No. 11/800,471, mailed Aug. 5, 2008.
Chen, Kuang-Han et al., "Multivariate Statistical Process Control and Signature Analysis Using Eigenfactor Detection Methods", 2001, pp. 1-21.
Gallagher, Neal B. et al., "Development and Benchmarking of Multivariate Statistical Process Control Tools for a Semiconductor Etch Process: Improving Robustness Through Model Updating" *Eigenvector-Research Inc.*, Manson, WA, USA, 1997, 8 pages.
Li, W., et al. "Recursive PCA for Adaptive Process Monitoring", J. Process Control, vol. 10, p. 471-486, 2000.
PCT International Search Report and Written Opinion for International Application No. PCT/U508/05667, mailed Aug. 18, 2008, 10 pages.
PCT International Search Report and Written Opinion for International Application No. PCT/U507/11106, mailed Jul. 14, 2008, 8 pages.
PCT International Search Report and Written Opinion for International Application No. PCT/U507/11142, mailed Jul. 28, 2008, 11 pages.
Spitzlsperger, Gerhard et al. "Fault Detection for a VIA Etch Process Using Adaptive Multivariate Methods" ISSM Tokyo 2004, p. 528-533.
Applied Materials, Inc. Notice of Allowance for U.S. Appl. No. 11/800,461, mailed Mar. 3, 2009.
Applied Materials, Inc. Supplemental Notice of Allowability for U.S. Appl. No. 11/800,461, mailed Jun. 1, 2009.
Applied Materials, Inc. Office Action for U.S. Appl. No. 12/004,667, mailed Jun. 22, 2009.
Applied Materials, Inc. Office Action for U.S. Appl. No. 11/800,471, mailed Feb. 3, 2009.
Applied Materials, Inc. Notice of Allowance for U.S. Appl. No. 11/800,471, mailed May 27, 2009.
Applied Materials, Inc. Office Action for U.S. Appl. No. 11/985,603 mailed Apr. 8, 2009, (8090P026C).
Applied Materials, Inc. Office Action for U.S. Appl. No. 11/985,603 mailed Nov. 20, 2009, (8090P026C).

* cited by examiner

GRAPHICAL USER INTERFACE FOR PRESENTING MULTIVARIATE FAULT CONTRIBUTIONS

TECHNICAL FIELD

Embodiments of the present invention relate to fault diagnosis, and more specifically to presenting multivariate fault contributions.

BACKGROUND OF THE INVENTION

Many industries employ sophisticated manufacturing equipment that includes multiple sensors and controls, each of which may be carefully monitored during processing to ensure product quality. One method of monitoring the multiple sensors and controls is statistical process monitoring (a means of performing statistical analysis on sensor measurements and process control values (process variables)), which enables automatic detection and/or diagnosis of faults. A "fault" can be a malfunction or maladjustment of manufacturing equipment (e.g., deviation of a machine's operating parameters from intended values), or an indication of a need for preventive maintenance to prevent an imminent malfunction or maladjustment. Faults can produce defects in the devices being manufactured. Accordingly, one goal of statistical process monitoring is to detect and/or diagnose faults before they produce such defects.

During process monitoring, a fault is detected when one or more of the statistics of recent process data deviate from a statistical model by an amount great enough to cause a model metric to exceed a respective confidence threshold. A model metric is a scalar number whose value represents a magnitude of deviation between the statistical characteristics of process data collected during actual process monitoring and the statistical characteristics predicted by the model. Each model metric is a unique mathematical method of estimating this deviation. Conventional model metrics include Squared Prediction Error (commonly referred to as SPE, Qres, or Q), and Hotelling's T2 (T2).

Each model metric has a respective confidence threshold, also referred to as a confidence limit or control limit, whose value represents an acceptable upper limit of the model metric. If a model metric exceeds its respective confidence threshold during process monitoring, it can be inferred that the process data has aberrant statistics because of a fault.

Once faults are detected, they are diagnosed by estimating a relative fault contribution of each process variable. Some faults are difficult to diagnose because they lack a straightforward (e.g., direct) correlation with a single process variable. Faults having complex and/or indirect correlations to multiple process variables can be especially difficult to diagnose.

Conventional user interfaces generally do not provide sufficient information in a user friendly manner to allow a systematic and logical detection and diagnosis of faults. This leads to obstacles in clearly determining the reason behind the fault contribution in variables and inefficiencies in classifying faults that have complex correlations to multiple process variables.

BRIEF DESCRIPTION OF THE DRAWINGS

This application file contains at least one drawing executed in color. Copies of this patent application publication with color drawings will be provided by the Office upon request and payment of the necessary fees.

The present invention is illustrated by way of example, and not by way of limitation, in the figures of the accompanying drawings and in which.

DETAILED DESCRIPTION

Figure 1:
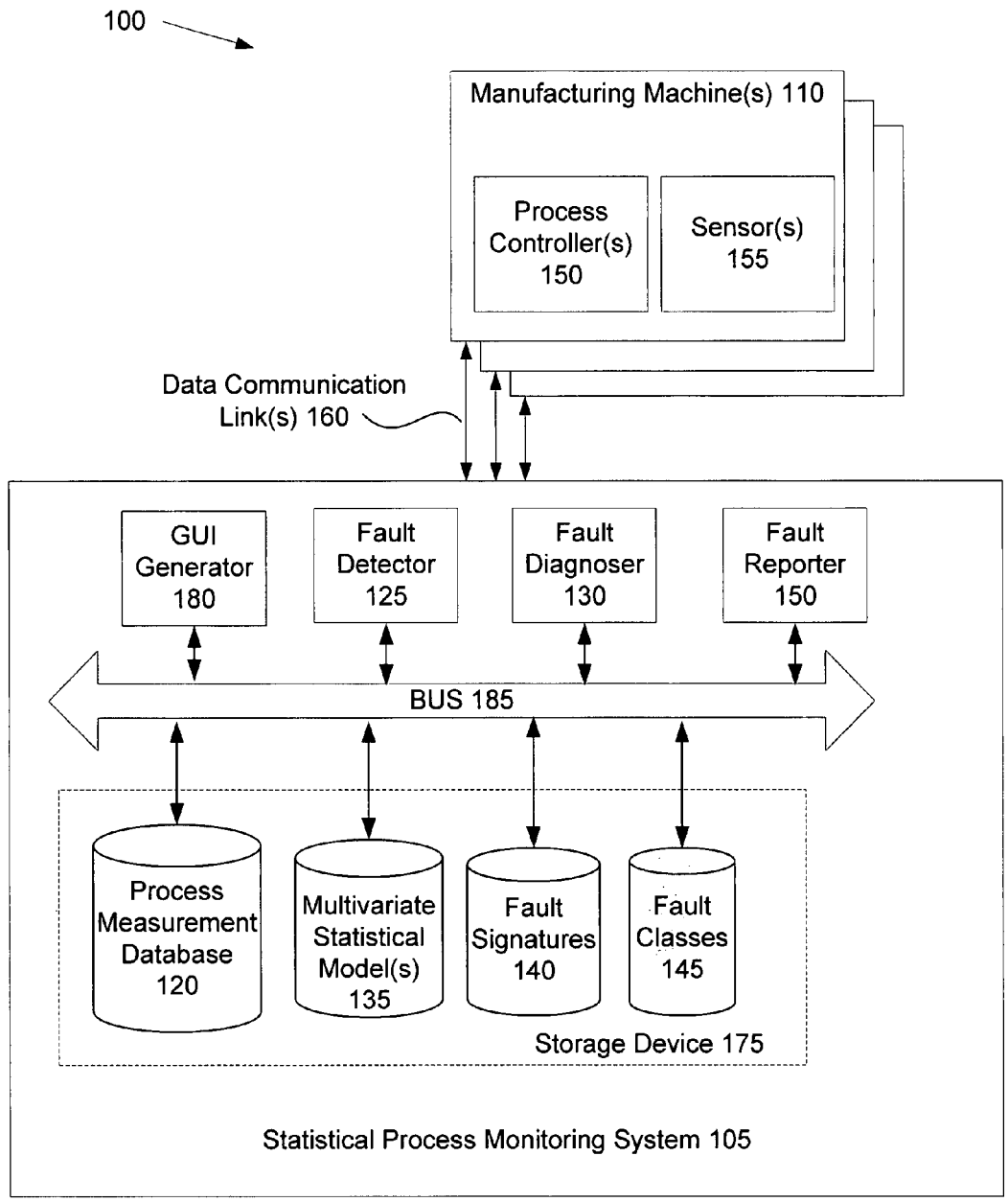
FIG. 1 illustrates a statistical process monitoring system in accordance to one embodiment of the invention.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The following description provides details of a statistical process monitoring system that monitors processes run on manufacturing devices to detect and/or diagnose faults (manufacturing irregularities). In one embodiment, the statistical process monitoring system is for use in the manufacturing of electronic devices (e.g., semiconductors). Manufacturing such devices generally requires dozens of manufacturing steps involving different types of manufacturing processes. For example, etching, sputtering, and chemical vapor deposition are three different types of processes, each of which is performed on different types of machines. Alternatively, the statistical process monitoring system may be used to monitor the manufacture of other products, such as automobiles. The manufacture of such other products may also require many different processing steps by various manufacturing machines.

FIG. 1 illustrates one embodiment of a statistical process system 100. The statistical processing system 100 includes a statistical process monitoring system 105 coupled with one or more manufacturing machines 110 and one or more process controllers 150 by data communication links 160. The statistical processing system 100 may include all manufacturing machines 110 in a factory (e.g., a fabrication facility). Alternatively, the statistical processing system 100 may include only some manufacturing machines 110 in the factory, such as all of the manufacturing machines 110 that run one or more specific processes.

In one embodiment, each of the manufacturing machines 110 is a machine for the manufacture of electronic devices, such as etchers, chemical vapor deposition (CVD) furnaces, photolithography devices, implanters, etc. Alternatively, the manufacturing machines 110 may be of a type for manufacturing other products (e.g., automobiles). In one embodiment, each of the manufacturing machines 110 is of a single type. Alternatively, the manufacturing machines 110 may include multiple different types of equipment, each of which may run different processes.

Each of the manufacturing machines 110 may include multiple sensors for monitoring processes run on the manufacturing machines 110. One type of sensor that may be included in the manufacturing machine is a temperature sensor. Examples of other sensors include pressure sensors, flow rate sensors, or any other sensors that monitor physical conditions of a manufacturing process or physical properties of a work piece manufactured by the manufacturing machines 110.

Each manufacturing process that is performed on a manufacturing machine 110 is characterized by various physical conditions and properties measured by the sensors, and by various operating parameters, collectively referred to as process data. Each distinct physical condition or property measured by sensors, and each operating parameter, may be a distinct process variable of the process data. Examples of process variables representing sensor data include chamber pressure, susceptor temperature, RF forward power, and RF reflected power. Examples of process variables representing operating parameters include flow rate settings (e.g., of chemical reagents), and throttle valve settings (e.g., for a chamber exhaust vacuum pump). The sensors, manufacturing machines and process controllers may be monitored during processing to gather the process variables at successive points in time.

In one embodiment, each process variable applies to a specific process. Alternatively, one or more process variables may apply to only portions of a specific process. In one embodiment, sensor measurements and operating parameters for different steps in a process represent distinct process variables (modeled as additional dimensions in model space). This may be useful, for example, if a manufacturing process being performed in a machine has multiple steps with different operating parameter settings. For example, in a three step manufacturing process, a susceptor temperature during the three steps would be treated as three distinct process variables. The division of process steps into separate dimensions in model space may be advantageous, for example, when a single process deposits multiple layers on a work piece, or when different steps of a process expose the work piece to different process conditions (e.g., pressure, temperature, etc.).

Process controllers 150 control operating parameters of manufacturing machines 110. For example, process controllers may control chamber temperature, vacuum pumps, gas injection systems, etc. of manufacturing machines 110. Process controllers 150 may store one or more process recipes (recipes) 170. Each recipe 170 may define operating parameters of a manufacturing machine 110 at each step of a process. In one embodiment, recipes 170 may be loaded into manufacturing machines 110 by process controllers 150.

Data communication links 160 may include conventional communication links, and may be wired or wireless. Data may be transmitted between the manufacturing machines 110, the process controllers 150 and the statistical process monitoring system 105 in a raw or processed format. In one embodiment, a semiconductor equipment communications standards (SECS) interface is used. In other embodiments, a generic model for communications and control of manufacturing equipment (GEM) interface, a SECS/GEM interface, a high speed SECS message services (HSMS) interface, etc, may be used.

The statistical process monitoring system 105 may be a single server that analyzes incoming process data from the manufacturing machines 110, sensors 155 and process controllers 150. Alternatively the statistical process monitoring system 105 may include multiple servers and/or computers. The statistical process monitoring system 105 in one embodiment includes components such as a fault detector 125, a fault diagnoser 130 and a fault reporter 150. The statistical process monitoring device 105 may also include a storage device 175. A BUS 185 is used for data communication among different components. In one embodiment, the statistical process monitoring system 105 is included in one or more of the process controllers 150. Alternatively, the statistical process monitoring system 105 may be a distinct and/or separate apparatus.

The storage device 175 may include a process measurement database 120, one or more multivariate statistical models 135, fault signatures 140 and fault classes 145. In one embodiment, the storage device 175 is a single storage device of a computer or server of the statistical process monitoring system 105. Alternatively, the storage device 175 may be external to the statistical process monitoring system 105. In one embodiment, the storage device 175 includes multiple storage devices, some of which may include redundant copies of data for backup.

Process measurement data (process data) may be stored in process measurement database 120. The stored process data may be used to show drifts and trends for each of the manufacturing machines 110, for processes run on the manufacturing machines 110, etc. In one embodiment, the stored process data is used to generate one or more multivariate statistical models 135, as described below. Once generated, the multivariate statistical models 135 may be stored in storage device 175.

In one embodiment, a training period is used to collect data for the generation of one or more multivariate statistical models. The training period covers a collection of process runs of a specific manufacturing process completed under known and/or controlled conditions on a particular manufacturing machine. Process data gathered from process runs completed during the training period may be used to generate statistics such as mean, variance, covariance matrix, etc. These statistics are used collectively to generate one or more multivariate statistical models, generally for a specific process that runs on a specific machine.

Each multivariate statistical model 135 may include one or more model metrics. Model metrics are scalar values that characterize an amount of deviation between a set of process data and a model. In one embodiment, the model metrics include Squared Prediction Error (commonly referred to as SPE, Qres, or Q) and Hotellings T2. Model metrics may also include combined metrics such as the Combined Multivariate Index (CMI). Each of these metrics corresponds to a different method of estimating the probability that process data being monitored has the same statistics as training data that was used to build the model. The aforesaid statistics and metrics may be calculated in accordance with conventional statistics algorithms.

One or more of the multivariate models may utilize Principal Components Analysis (PCA) to transform an M-dimensional process variable space to an N-dimensional space of mutually orthogonal principal components, where M is the number of process variables, and N is much smaller than M. PCA calculates a set of M eigenvectors and M eigenvalues, where each respective eigenvector transforms process variable data to a respective dimension of the principal component space, and each eigenvalue is proportional to the amount of variance represented by a corresponding eigenvector. To simplify (reduce the dimension of) the principal component space, the N eigenvectors corresponding to the N largest eigenvalues are retained in the model; the other eigenvectors are discarded or ignored. The number N of principal components retained in the model is a parameter of the model that may be user selected. The number of principal components (N) may be chosen based on a tradeoff between a model explaining less of the data variance when using a smaller value of N and the model being over-specified when using a larger value of N.

Once one or more multivariate statistical models have been generated, they may be used by fault detector 125 to monitor processes run on manufacturing machines 110. Fault detector 125 analyzes process data by executing various statistical process monitoring methods, each of which is based on at least one multivariate statistical model. In one embodiment, fault detector 125 receives process measurement data (process data) directly from the manufacturing machines 110, sensors 155 and/or process controllers 150. In another embodiment, fault detector 125 may receive process data from the process measurement database 120. In yet another embodiment, fault detector 125 receives process data from both sources.

To detect faults, fault detector 125 calculates statistics of process data for processes being monitored, and compares the calculated statistics with corresponding statistics of appropriate multivariate statistical models. The statistics may be compared for one model metric, or for multiple model metrics (e.g., T2, SPE, CMI). If one or more of the model metrics exceed a predetermined threshold (referred to as a confidence limit or control limit), a fault may be detected. In one embodiment, each model metric has a threshold value that is statistically determined. The chosen threshold value may represent a compromise between risk of a false alarm (if the threshold is too low) and risk of failing to detect a fault (if the threshold is too high). Where multiple metrics are calculated, faults may be triggered if any one of the metrics exceeds threshold values. Alternatively, some faults may be indicated only if certain metrics exceed threshold values or only if multiple metrics exceed threshold values.

Once a fault has been identified by the fault detector 125, the fault is analyzed by fault diagnoser 130. Fault diagnoser 130 compares the fault to a collection of fault signatures 140. Each fault signature represents process conditions representative of a specific fault or faults. In one embodiment, fault signatures 140 are ranked lists of process variables that have a greatest statistical contribution to a specific fault or faults. Fault diagnoser 130 may compare each stored fault signature to a ranked list of process variables having greatest contributions for a current fault. When there is a high degree of similarity between one of the fault signatures 140 and the current fault, a match is reported.

Each of the fault signatures 140 is associated with one or more fault classes 145. The fault classes 145 may indicate an actual problem that generated a current fault, or a probable cause of the current fault. For example, if the fault signature indicates that the greatest contributing process variable was silane flow rate, the fault class may indicate that a valve that feeds silane into a chamber has malfunctioned.

Fault reporter 165 generates fault reports indicating which fault class or fault classes 145 correspond to a current fault. The fault reports may be sent to one or more clients (not shown) (e.g., local computers, remote computers, personal digital assistances (PDAs), pagers, cell phones, etc.) that are networked to the statistical process monitoring system 105. Fault reporter 165 may also cause manufacturing machines 110 to be shut down, cause a machine to alarm, or cause other appropriate actions.

GUI (Graphical user interface) generator 185 is used to graphically illustrate information related to faults, fault contributions and the multiple variables. In one embodiment, GUI generator 185 displays fault and fault contribution information in accordance to the statistical data processed using multivariate model metrics and the like. In another embodiment, GUI generator is configured display information about each of the multiple variables involved in the manufacturing process according to the information available for each component within each variable. In one embodiment, the GUI generator 185 may display graphical information in the form of graphs, bar charts, data plots, heat maps etc. Heat map is a type of graphical illustration where different colors, patterns, shadings, symbols etc. are used to represent data ranges in a two dimensional graphical illustration. In another embodiment, the GUI generator 185 is also configured to display raw information available for individual components of a variable as well as statistically processed information for each variable or one or a combination of its components. GUI generator 185 is a part of the fault detection and fault diagnosis process. GUI generator 185 can generate graphical illustrations that allow a user to detect fault at a simple glance. GUI generator 185 may also present information about components and variables logically and allow a user to perform fault diagnosis to identify causes of fault in increasing level of depth, thus providing a systematic analysis of the fault.

Manufacturing processes often drift over time, even in the absence of a fault. For example, the operating conditions within a semiconductor process chamber typically drift between successive cleanings of the chamber and between successive replacements of consumable chamber components. By adapting to process drift, changes in process variables caused by drift are not erroneously interpreted as faults.

Fault detection and diagnosis using a graphical user interface will now be described. Principles of fault detection and diagnosis will not be described in detail as they are described in co-pending U.S. Patent Applications titled "Adaptive Fault Detection" and "Ranged Fault Signatures for Fault Diagnosis" by Harvey et al. The present description is concerned with the user interface and the presentation of graphical information which may enable a user to detect and diagnose a fault. It should be appreciated that the information presented in the following figures are graphical in nature and the same information may be presented in a different format as presented without deviating from the principles in detecting and diagnosing fault as taught.

Figure 2:
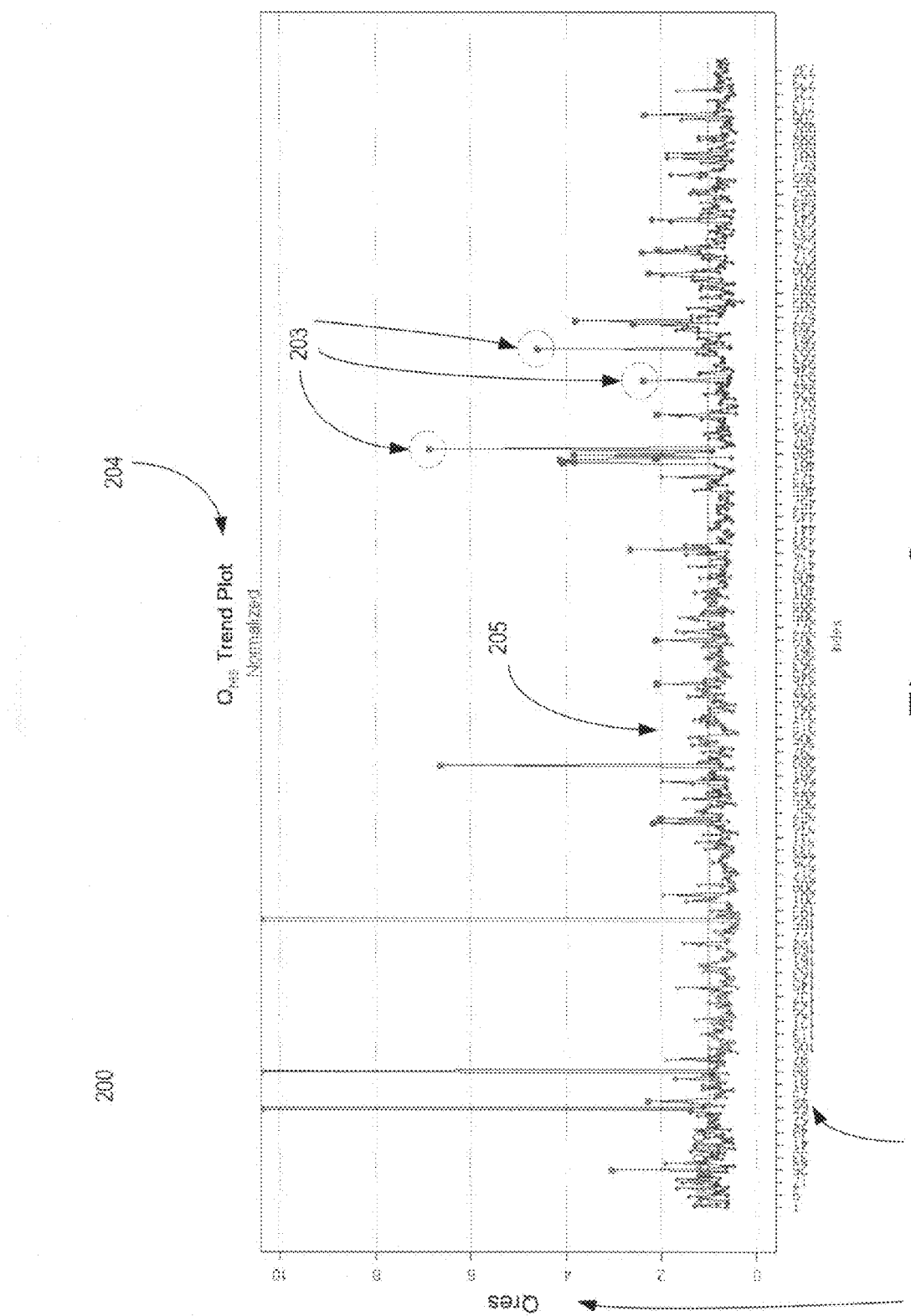
FIG. 2 illustrates a trend plot model of a multivariate model metric for multiple samples in accordance to an embodiment of the invention.

FIG. 2 illustrates a trend plot of multivariate model metric of multiple samples in accordance to an embodiment of the invention. A user can detect fault visually by displaying multivariate model metric of samples as presented in a format in FIG. 2. It should be appreciated that the format of presenting the model metric of the sample may be different and the plot shown should be interpreted as illustrative but not restrictive.

As described earlier, a model metric is a scalar number whose value represents a magnitude of deviation between the statistical characteristics of process data collected during actual process monitoring and the statistical characteristics predicted by a statistical model. For the purpose of exemplary illustration and not by restriction, normalized Squared Prediction Error (SPE), or Qres 201, is used. Qres values on the y-axis are shown plotted against corresponding samples 202 on the x-axis. Each sample 202 represents a wafer in a wafer manufacturing process. Other common model metric that can be used are, for example, Hotelling's $T^2$, other combined metrics such as a metric commonly referred to as combined multivariate index, etc. Each model metric, Qres, in this case, has a confidence threshold whose value represents an acceptable upper limit of the model metric. Accordingly, any sample or wafer with a Qres value exceeding the predetermined confidence threshold infers there is at least a variable causing fault. In other words, a fault can be detected for a sample or wafer if its corresponding model metric value on the trend plot has a higher valued than the established confidence threshold. For example, if points 203 are above a hypothetically pre-determined threshold represented by line 205 corresponding to a Qres value (e.g., 2), a fault is detected for the sample corresponding to each point 203. By illustration and not by limitation, the values on the x-axis represent an index and each value represents a sample. The x-axis may alternately be represented in a time scale or a series of time stamps to designate different samples.

One should appreciate that a model metric exceeding a threshold merely suggests a fault and does not indicate the type of fault or cause of the fault. Determination of the cause of the fault requires further analysis. Each point in the graphical illustration may be placed into a fault class after fault detection to attribute the cause of the fault. Points with similar Qres or model metric values do not suggest they are of the same fault class. In other words, fault class and model metric confidence thresholds are not correlated. Model metric merely suggests if a fault exist, in a sample or not. Fault classes may be assigned upon deriving more information from the reasons behind each contribution to the fault by each of the variables.

Multivariable information on the process in which the sample is manufactured can be provided for each data point on the graphical display as shown in FIG. 2. In this case, each value on the graph corresponds to a specific sample. In this embodiment, a user can point and click on any data point on the graphical user interface and the action will take the user to a different display presenting fault contribution information related to different components associated with each of the multiple variables. In other words, clicking on a point in this graphical display allows an expansion of the graphical representation from fault to fault contributions in relation to multiple variables and their components. Providing multivariate information for each data point can selectively be made available to some or to all the different graphical data in the graphical user interface described. This unique feature allows a user to easily learn more information about the variable and related components in the process of understanding and determining the relative contributions of the variables to the fault.

Figure 3:
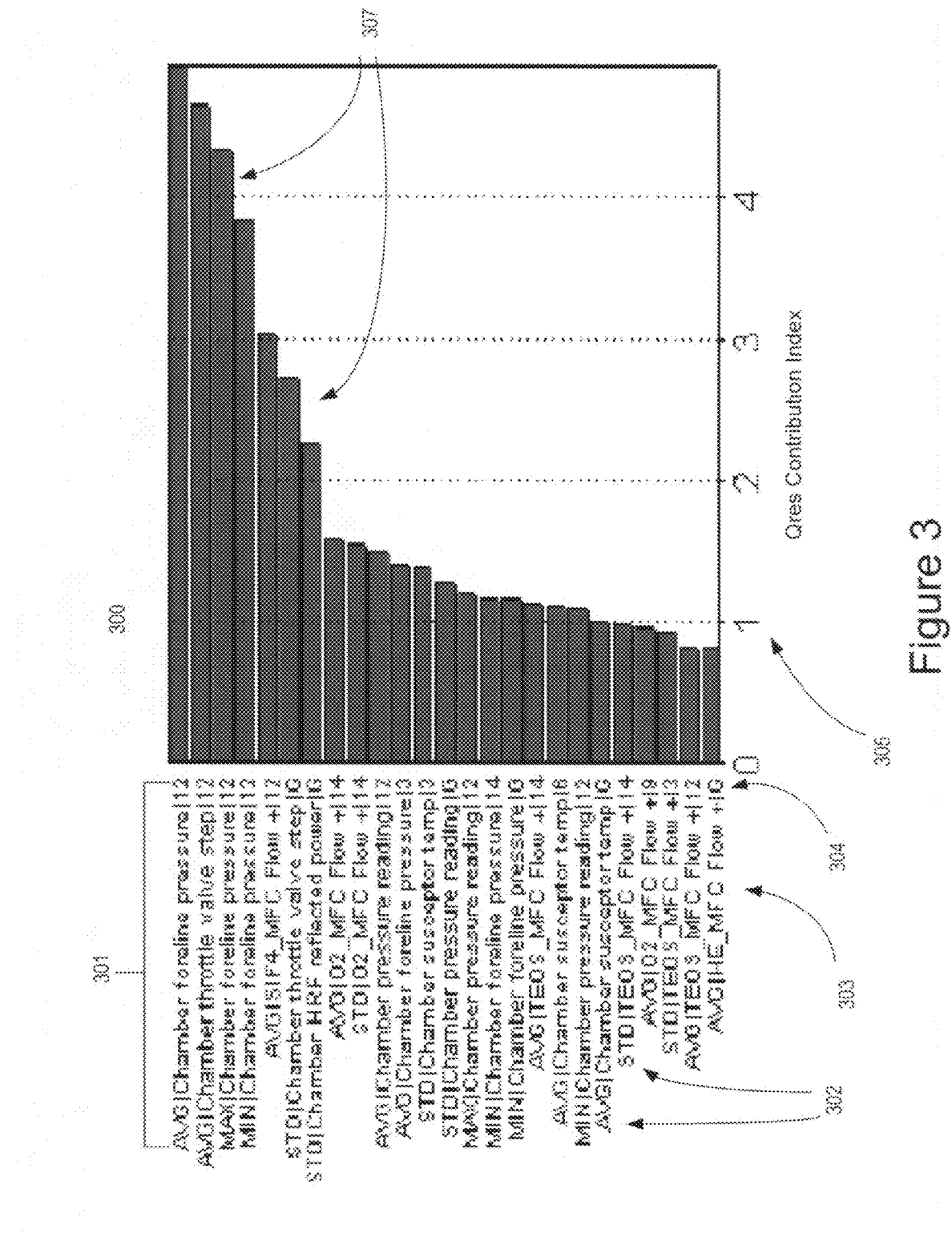
FIG. 3 illustrates a presentation of fault contribution with limited information as selected from a point in FIG. 2 in accordance to an embodiment of the invention.
Figure 4:
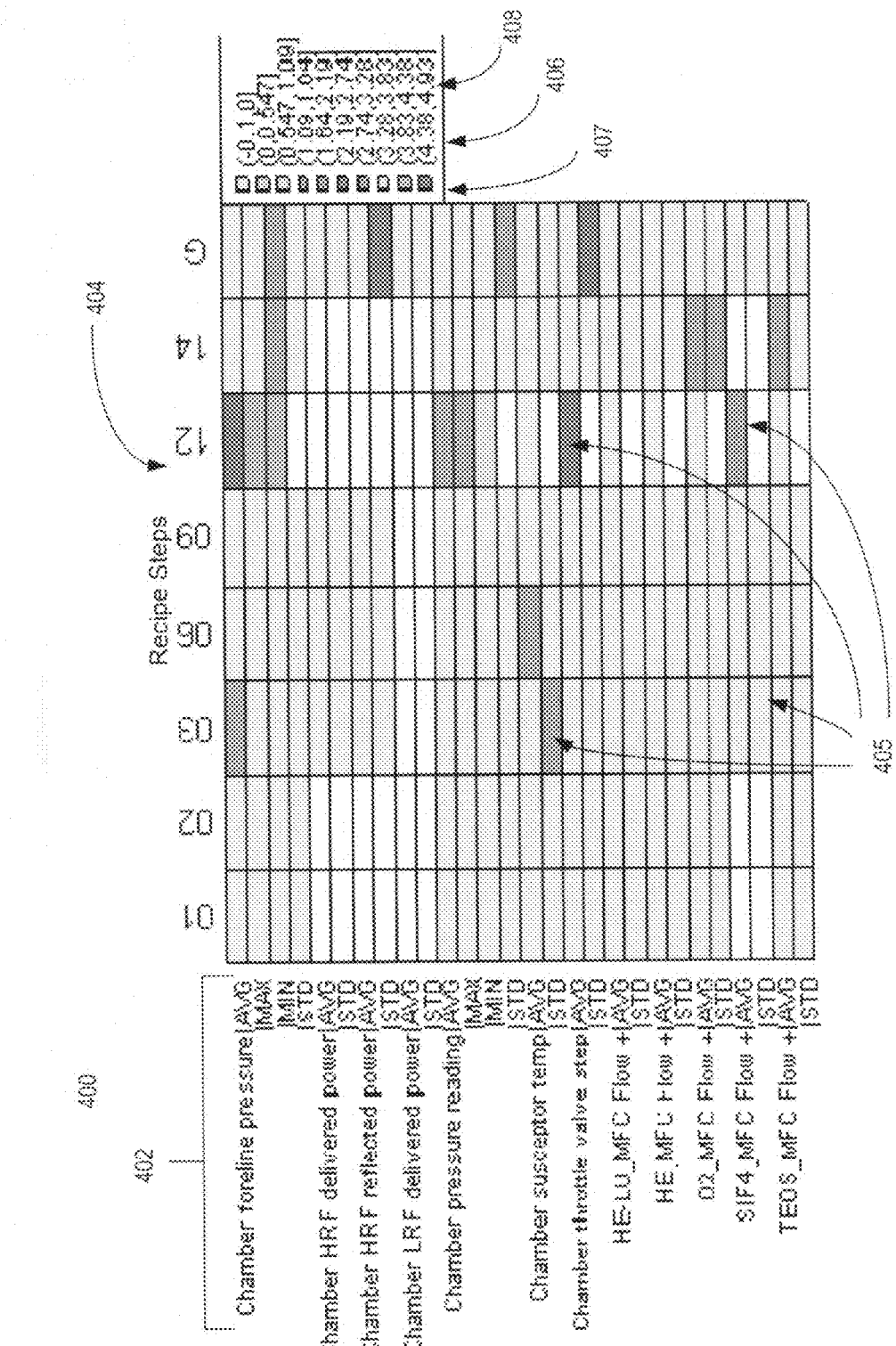
FIG. 4 illustrates a presentation of contributions to the fault correlating to different components in multiple variables in a process manufacturing a sample as selected from a point in FIG. 2 in accordance to an embodiment of the invention.

As described, the graphical illustration of FIG. 2 may be linked to different graphical displays. FIG. 3 is a presentation of fault contribution with limited information as selected from a point in FIG. 2 in accordance to one embodiment of the invention; in contrast, FIG. 4 is an illustration of contributions to the fault which correlate to different components in different variables, in accordance with another embodiment of the invention. All the variables and components associated with the variables are part of the manufacturing process of the sample as selected from a point in FIG. 2. As will be seen, FIG. 4 can display much more information than the illustration of FIG. 3.

FIG. 3 shows a graphical display 300 having multiple variables, each having components, displayed along the y-axis. A fault contribution index 305 is displayed along the x-axis. Each of the variables 301 contains at least two components and all the different variables have the same components but different variables contain different sub-components for each component. In the example as shown, the different variables are observed in a process of manufacturing a wafer. The components in this example are statistics 302, sensors 303, and recipe steps 304. Each component may be further divided into sub-components. For example, statistics may be further divided into subcomponents that include but are not limited to average, standard deviation, minimum, and maximum of sensor values. Sensors may be divided into subcomponents that include but are not limited to chamber pressure reading, susceptor temperature, chamber foreline pressure, and Helium MFC flow etc. Recipe steps represent the different steps in the recipe used to manufacture a wafer. A complete variable should include all of its components and different variables may be different in the combination of subcomponents contained within the components.

Methods and apparatuses described in this application may apply to highly complex manufacturing process, including but not limited to semiconductor wafer manufacturing, which may include about 30 sensors, 10 steps and 10 statistics per lot of wafers. These different components combine to generate about 3000 sensor statistics per lot of wafers. There are multiple slots of wafers within each lot of wafers. For example, each lot of wafers may have about 25 slots of wafers, so, there may be about 75,000 sensor statistics for each lot of wafers.

FIG. 3 displays the fault contribution corresponding to each variable. The display of FIG. 3 shows only a part of the picture from the limited portion of information available. Specifically, FIG. 3 only shows the variables that have the highest fault contributions for the selected sample from FIG. 2. Each variable 301 is displayed with all of its components (302-304) and the fault contribution corresponding to that variable is indicated by a bar 307. In an alternative embodiment, it is desirable to illustrate a complete picture and display more information about all the variables. One reason to display as many variables and their respective contributions as possible is because there are may be false positives and false negatives in faults caused by aberrant factors generating fault contributions. Being able to probe the respective contributions of variables according to relationships of components will help to improve the ease of recognizing false negatives and false positives. FIG. 4, having the ability to potentially display all variables, may present patterns of fault contribution and relationships between fault contribution of components and variables.

FIG. 4 is a different embodiment compared to FIG. 3. FIG. 4 displays fault contributions in an efficient manner by incorporating information about all components in all variables while at the same time giving a user immediate feedback about the relative contributions to the fault by the variables. FIG. 4 presents a complete picture of relative fault contributions by each variable and the related components at one quick glance. Unlike FIG. 3 which only selectively displays variables with the highest contributions to the fault, FIG. 4 displays all variables. This is made possible by breaking up components of each variable in the display. Rather than displaying the components of variables together, FIG. 4 breaks up the components into at least two groups, one on the x-axis and another on the y-axis.

In one embodiment, as shown in FIG. 4, one group of components displayed on the y-axis are the sensors and statistics 402 and the second group of components displayed on the x-axis is the recipe steps 404. Each of the areas 405 where corresponding entries of the two groups intersect, are known as cells. Each cell provides a visual indicator of fault contribution of relevant components. Such a visual indicator may be color, symbol, size or any other graphical representation. In FIG. 4, fault contribution is represented by the color of each cell. The color in each cell represents the fault contribution of a variable associated with the particular components. The legend 406 shows the respective colors 407 corresponding to the relative ranges 408 of contribution to the fault. For example, the two ranges 0.1 to 0 and 0 to 0.547 are represented by different shades of gray; the three ranges 0.547 to 1.09, 1.09 to 1.64, and 1.64 to 2.19 are represented by three different shades of blue; the two ranges 2.19 to 2.74 and 2.74 to 3.28 are represented by two different shades of green; 3.28 to 3.83 is represented by yellow; 3.83 to 4.38 is represented by orange; and the highest range of contribution to the fault 4.38 to 4.93 is represented by red. The contribution values or contribution ranges to a fault may be in a logarithmic scale or a linear scale.

As discussed before, fault contribution may be represented differently than by a color scheme in an alternative embodiment. For example, different fault ranges may be represented by different patterns or shading of the cell. In yet another embodiment, different fault contribution ranges may be represented by a combination of color, shading, or patterns. While the illustration is in 2 dimensions, the display may be represented in 3-dimensions. In one embodiment, a third axis on a graphical illustration could be values of the fault contribution, in which case, rather than presenting relative contributions of fault in ranges, the illustration may be based on the actual value of contribution to the fault.

In an embodiment where the presentation is a two dimensional display, cells may be further subdivided to represent subcomponents of a component not displayed on either axis. In one such embodiment, as an exemplary illustration, the x-axis may represent the recipe steps, the y-axis may represent sensors, and each cell may be subdivided into four, where each cell represents statistics as a component. Each of the four subdivisions may correspond to subcomponents of the statistic component, such as minima, maxima, average, and standard deviation of a particular sensor corresponding to a particular step. Color may similarly be used in each subdivided cell for such an embodiment to illustrate their respective contribution to the fault. Alternatively, patterns, shading, or a combination thereof may be used.

One benefit of presenting data in the form of FIG. 4 is the ability to display data in terms of how they are related and in accordance to the importance of their relationships. The organization of the display or grouping of components as represented by x-axis or y-axis or in the cells may be arbitrarily chosen by the user depending on the particular message a user wants to deliver and how the data are related. For example, if contribution to fault based on sensors and recipe steps are most important, a lesser number of statistics may be presented to simplify the display, or statistics may be represented by subdivisions of the cell instead. For instance, as described, statistics may be divided into four subcomponents, minima, maxima, average and standard deviation, so readers of the display may readily identify contributions to fault attributed by the particular sensor in a particular step at first glance of the cell only without reviewing details of the subdivisions.

Figure 5:
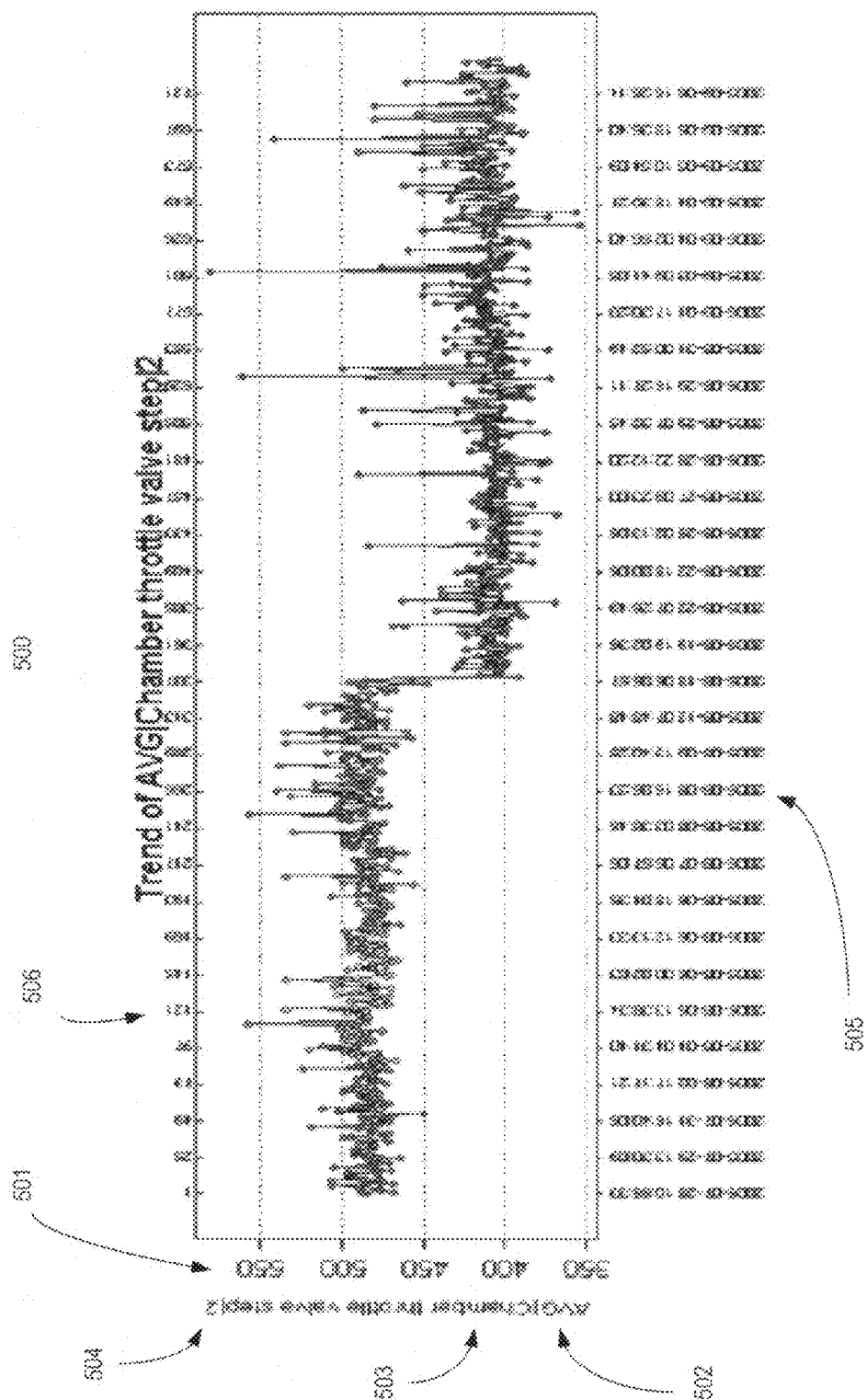
FIG. 5 illustrates a presentation of a trend of a variable component in a manufacturing process each corresponding to a different contribution to a fault for multiple samples in accordance to an embodiment of the invention.

Similar to FIGS. 2 and 3, each of the cell or subdivisions in a cell may link the user to a different or more in depth level of information not previously provided. For FIG. 4, each cell or subdivided cell may link the user to a trend of that specific sensor statistic corresponding to the particular recipe step for all wafer samples, as shown in FIG. 5. It should be appreciated that FIG. 4 displays the fault contribution by each variable in that wafer and may be considered as an expansion of data from FIG. 2 that displays fault of a particular sample of wafer. FIG. 5 displays a different level of information. It shows the specific variable, a particular sensor statistic in a particular step (e.g., chamber throttle valve in step 2) and compares it against the same variable in other samples. Therefore, one should appreciate that FIG. 5 is both more focused (displaying only one variable corresponding to the particular components) and more broad (comparing against all other samples) as compared to FIG. 4. One should appreciate that other information may be presented via a link in FIG. 4 and illustration of FIG. 5 should be viewed as illustrative rather than restrictive.

FIG. 5 is a graph 500 illustrating the trend of average chamber throttle valve in recipe step 2 in accordance with one embodiment of the invention. The y-axis 501 has different components, the sensor statistic 502 (e.g., average chamber throttle valve), and the recipe step (e.g., step 2) 504. Each number 506 along an x-axis on top of the graph represents a different wafer sample. Each entry 505 along an x-axis on bottom of the graph is a time stamp indicating when a wafer sample is produced. The graphical illustration compares values of average chamber throttle valve in recipe step 2 for all wafer samples.

It should be appreciated that FIG. 5 is only an exemplary illustration of the extended information associated with one cell in FIG. 4. Alternatively, selection of different cells may cause different information about different components to be displayed as compared to what was selected in FIG. 5. For example, activation of a different cell in FIG. 4 may present the trend of a different sensor statistic as selected for a different recipe step over different samples. In yet another embodiment, rather than comparing different selected components against different sample wafers, other comparisons may be made, such as, comparisons of the selected components against historical information over a time period, or comparisons on a different basis as oppose to samples.

Figure 6A:
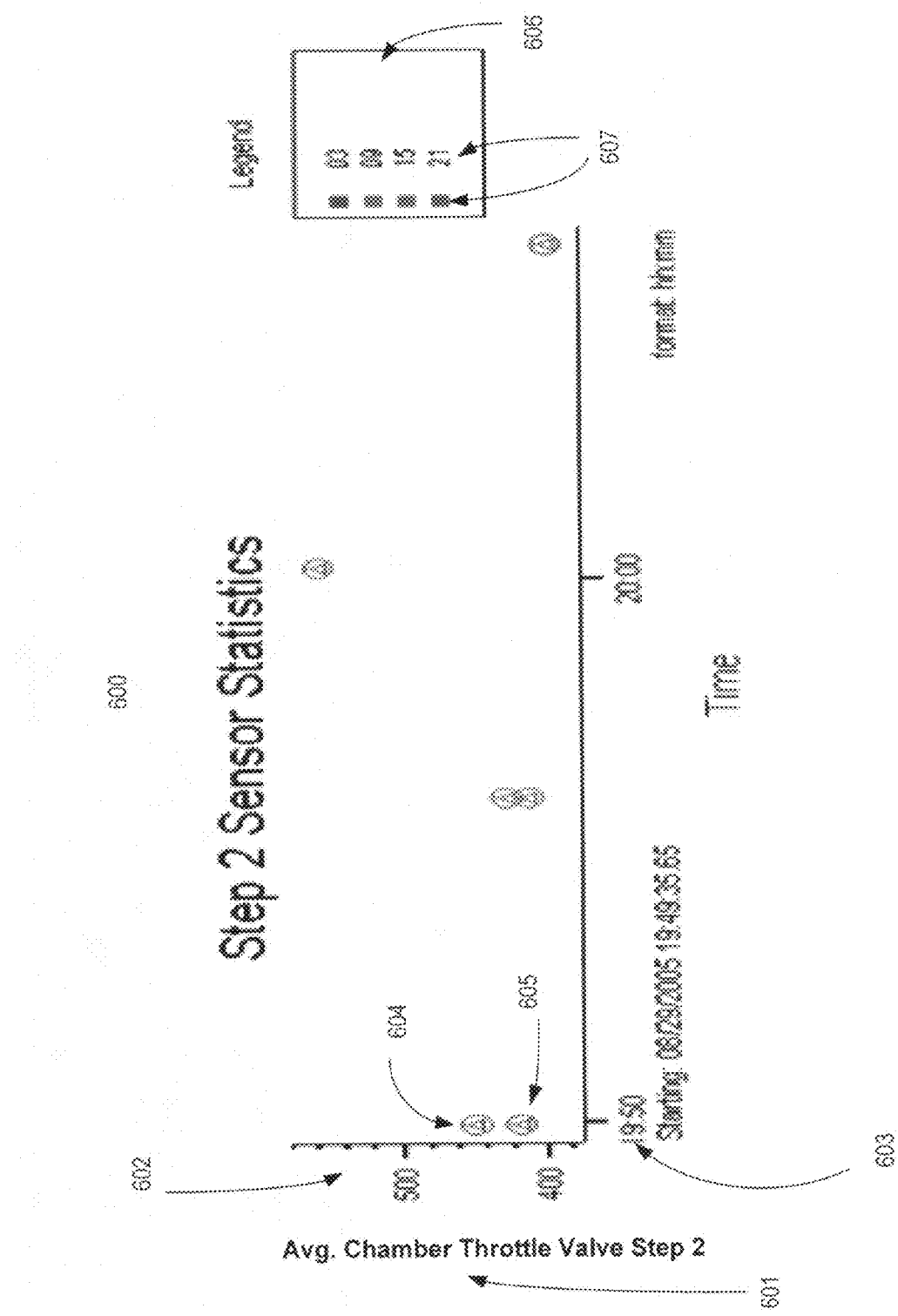
FIG. 6A illustrates a presentation of a variable component of one sample in FIG. 5 with comparisons to the values of the variable component of other selected samples in accordance to an embodiment of the invention.
Figure 6B:
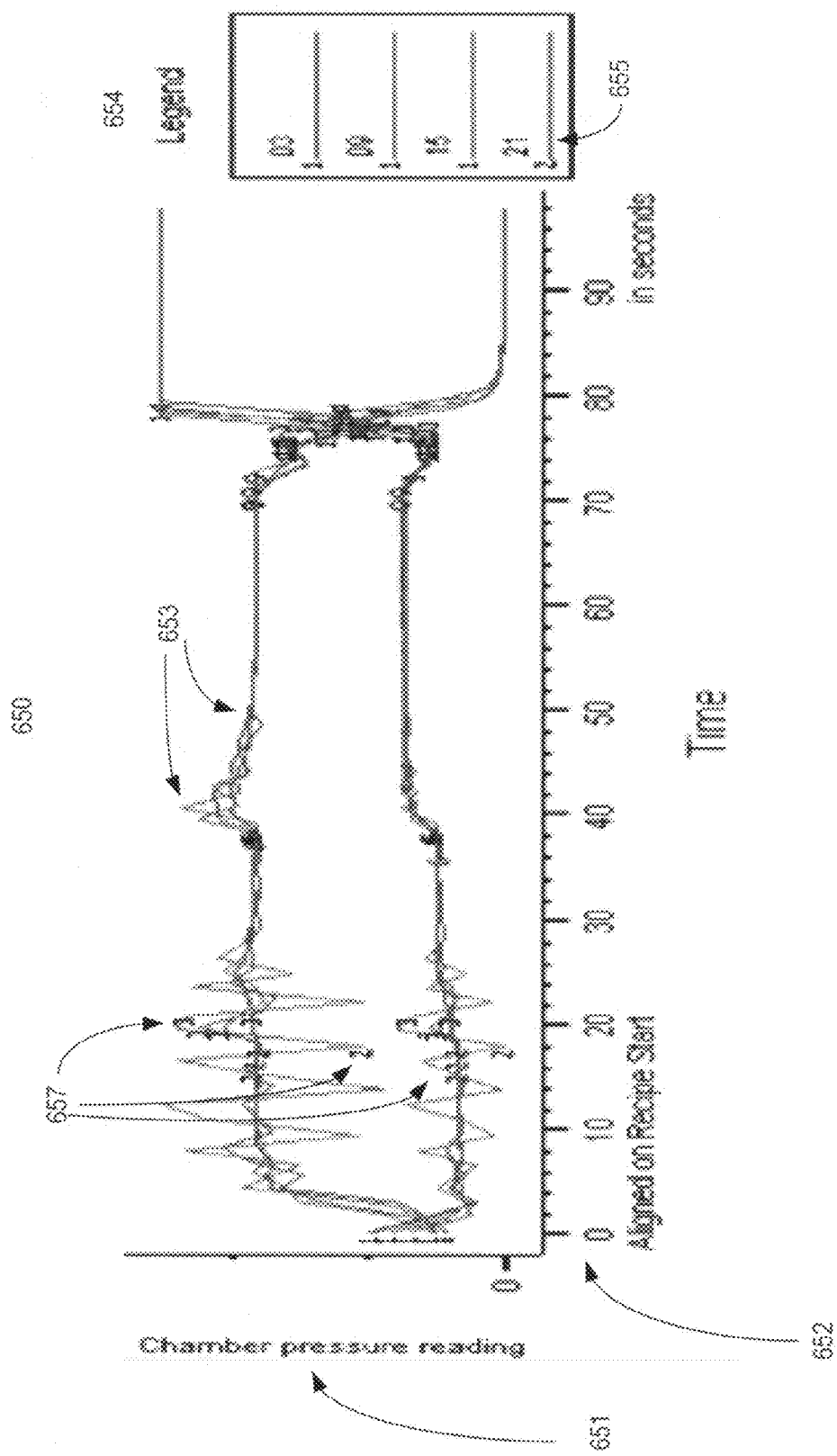
FIG. 6B illustrates a presentation of a raw data recording of the variable component of the one sample in FIG. 5 with comparisons to the raw data recording of selected samples in accordance to an embodiment of the invention.

Similar to FIGS. 2-4, each data point in FIG. 5 a can also link to additional information for the variable selected in FIG. 4, such as information at a different level or a more detailed level for fault diagnosis. FIG. 6A shows information linked from a chosen variable in FIG. 5 in an expanded view with comparisons to values of the chosen variable in other selected samples, in accordance with one embodiment of the invention. FIG. 6B shows raw data recording of the chosen variable in FIG. 5 with comparisons to the raw data recording of other selected samples in accordance with one embodiment of the invention.

FIG. 6A shows graphical illustration 600 with an x-axis 603 showing time stamps of samples, e.g. wafers, and a y-axis 602 showing values of the variable as chosen in FIG. 5. In this embodiment, the chosen variable contains the same components (e.g. Average chamber throttle valve in recipe step 2), as described in graphs 4 and 5. Each point on the graph represents a wafer. As described earlier, each lot of wafers contains multiple slots, thus, every different point(s) corresponding to a time stamp correspond to wafers of different slots within a same lot. For example, point 604 and point 605 at time stamp "19:50" correspond to two different wafer slots in the same wafer lot. The legend 606 shows different colors 607 corresponding to different runs or different lots of wafers. For example, blue corresponds to wafer lot 03; red corresponds to wafer lot 09, green corresponds to wafer lot 15; and purple corresponds to wafer lot 21.

FIG. 6A compares the selected variable and corresponding component to other reference samples. In one embodiment, the reference samples may be arbitrarily selected. In another embodiment, the reference samples are ones selected from samples with "normal" or "typical" or "expected" values which may be considered to be a "standard". In another embodiment, the reference samples may be samples of the same lot but different slots, or a limited number of samples of different lots entirely. Note that FIG. 6A is similar to that of FIG. 5 except it is in more details. For instance, FIG. 6A shows samples of wafers of a same lot but different slots whereas FIG. 5 shows only different samples of wafers from different lots. Furthermore, FIGS. 5 and 6A differ in that the former shows a large number or up to all of the wafers or lots, whereas the latter only shows a selected few based on additional criteria, such as whether those samples displayed are considered to be "standard" values.

FIG. 6B shows a graphical illustration 650 of the variable and corresponding components as selected in FIG. 5. FIG. 6B shows the readings 651 of the variable and a component, e.g., a sensor—chamber pressure, on the y-axis, and time 652 on the x-axis. In this embodiment, time on the x-axis is corresponding to the recipe steps of the manufacturing process. Also in this embodiment, the recipe steps 657 are labeled on each tracing on the graph and approximately correspond to the time on the x-axis at which the step takes place. Each tracing on the graph represents an individual wafer or trial run as explained by legend 654. Each tracing 655 and the color of the trace as shown represents the real time reading of the sensor, without the statistic, in all the recipe steps during the process of manufacturing that particular wafer lot. For example, wafer 3 or run 3 has a blue tracing; wafer 9 or run 9 has a red tracing; wafer 15 or run 15 has a green tracing and wafer 21 or run 21 has a purple tracing. FIG. 6B also shows that the Chamber pressure reading fluctuates tremendously at or about recipe step 2, as compared to the other selected wafers, explaining the contribution of fault as shown earlier in FIGS. 4 and 5.

This process of displaying a different, and often more in depth level of information from one graphical display to another in the user interface may be referred to as drilling down. The process of drilling down is essential to fault diagnosis by allowing users to identify important changes to a variable and causes related to that variable so that a particular fault may be classified. Furthermore, fault signatures may be established where each signature is associated with at least one fault class. Each fault signature generally specifies a ranked list of a subset of process variables having the greatest statistical contributions to the fault class. The ranking of the process variables is in the order of the relative magnitudes of their respective contributions. The relative magnitude of the contribution of each process variable to a given fault class can be determined by statistical process monitoring method, such as any method for determining the respective contributions of the process variables to at least one model metric whose value is abnormally high as a result of a fault in the given fault class.

Figure 7:
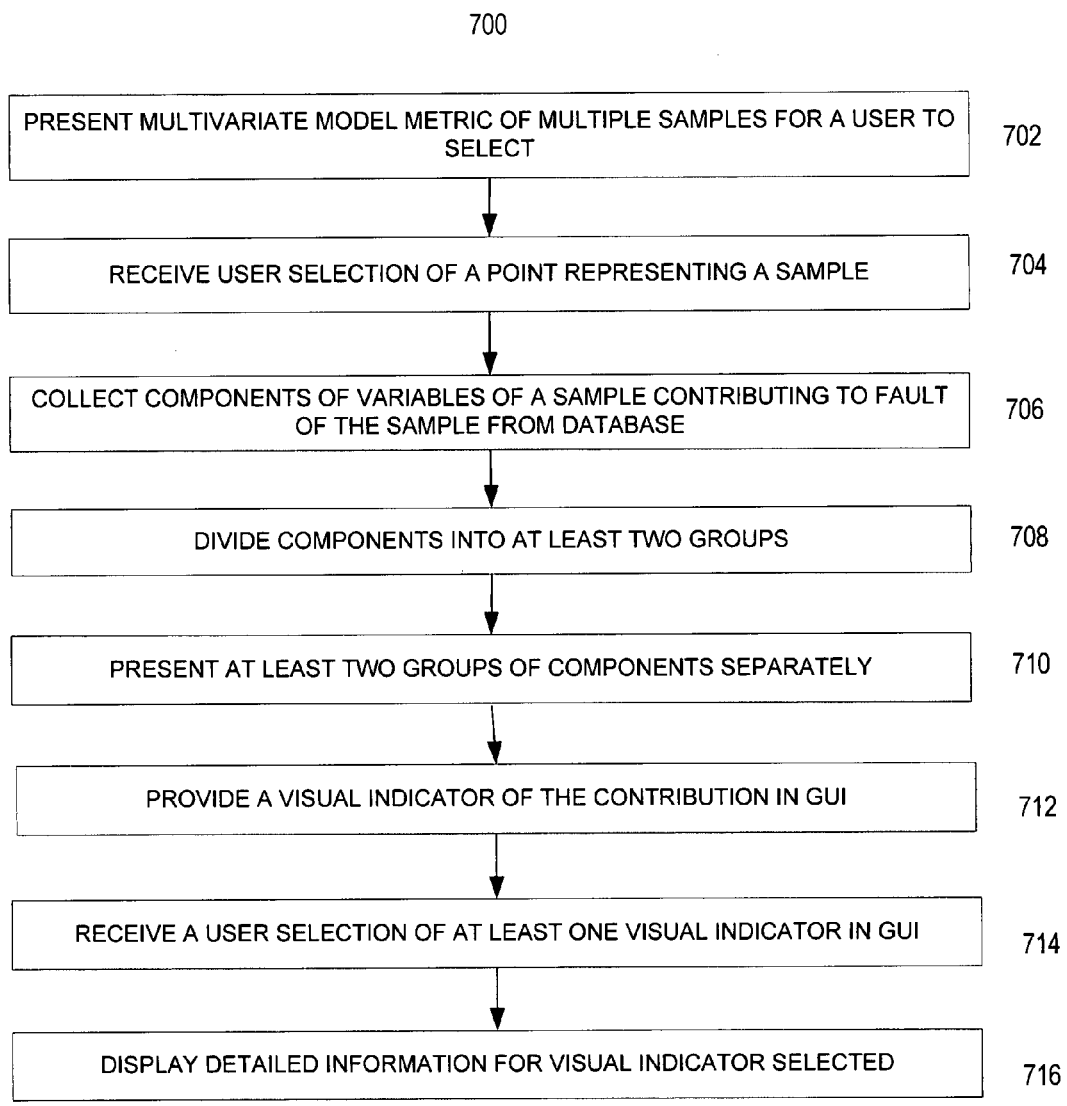
FIG. 7 illustrates a flow diagram for a method of generating a user interface to present multivariate fault detection in accordance to an embodiment of the invention

FIG. 7 is a flow diagram of one embodiment for a method 700 generating a user interface to present multivariate fault detection. This method may be performed by processing logic that may comprise hardware (e.g., circuitry, dedicated logic, programmable logic, microcode, etc.), software (such as instructions run on a processing device), or a combination thereof. In one embodiment, method 700 is performed by the statistical process monitoring system 105 of FIG. 1.

Referring to FIG. 7, at block 702, processing logic presents multivariate model metric data of multiple samples. Each model metric data is associated with a sample and may or may not represent a fault. In one embodiment, the presentation of data may be similar to FIG. 2. Each data is further linked to more information about the model metric of the sample. If the model metric represents a fault, the relative contributions to the fault by the multiple variables may be displayed in response to a user selecting a data point. Each multivariate fault may be a result of at least one contribution from at least one variable in the process of making the sample. At block 704, processing logic receives a selection of a point representing model metric data of a sample. At block 706, processing logic collects components of variables of a sample contributing to a fault of the sample from the database in response to the user selection of data. At block 708, processing logic divides the components into at least two groups and at block 710, processing logic presents the at least two groups of components separately. In one embodiment, one group of components may be presented on an x-axis and a second group of components may be presented on a y-axis. If more components or subcomponents are present, it may be presented in a third dimension or presented as subdivisions of cells if the graphical display is in a two dimensional view.

At block 712, processing logic presents a visual indicator of the fault contributions of each component of a variable in relation to other component(s) of the variable. The fault contribution may be in a linear or logarithmic scale, the scale may be selectively displayed depending on preference of a user. Contributions to each fault may also be displayed in ranges or as a value. For example, the degree or amount of contribution may be displayed in different colors, different patterns, different shadings, or simply different values. In one embodiment, the display may be similar to what is shown in FIG. 3. In another embodiment, the display may be similar to what is shown in FIG. 4. The display though generally presented in a two dimensional view for easy understanding, may also be presented in a three dimensional view.

At block 714, processing logic receives a user selection of at least one visual indicator in the GUI. At block 716, processing logic displays information for and in respond to the visual indicator selected in the GUI. The information displayed is more detailed or provide information relevant the fault contribution that may allow a user to analyze and diagnose the cause of the fault as it pertains to the variable and its associated components.

Figure 8:
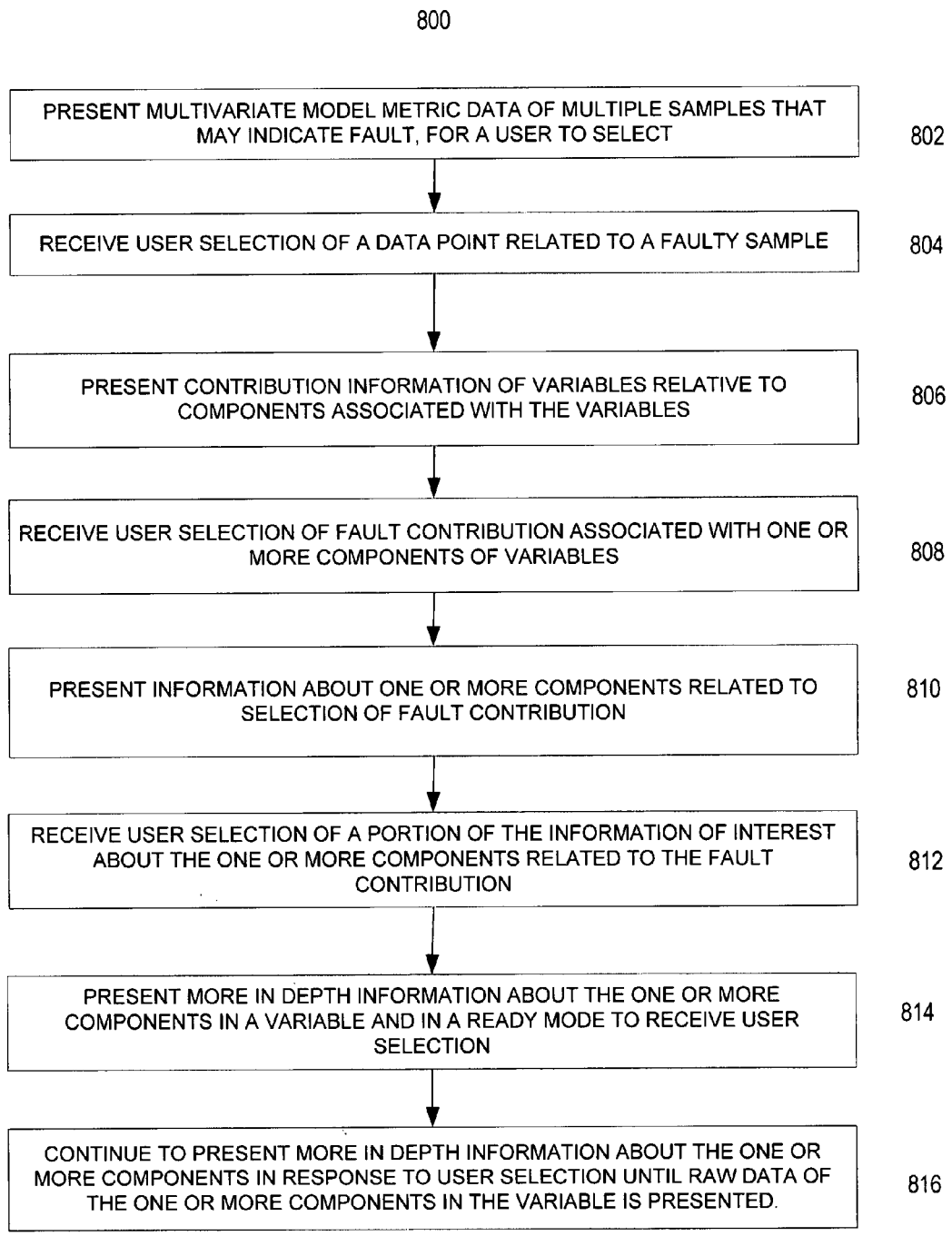
FIG. 8 illustrates a flow diagram for graphically detecting and diagnosing faults in accordance to an embodiment of the invention.

FIG. 8 is a flow diagram of one embodiment of a method 800 for facilitating graphically detecting and diagnosing faults. This method may be performed by processing logic that may comprise hardware (e.g., circuitry, dedicated logic, programmable logic, microcode, etc.), software (such as instructions run on a processing device), or a combination thereof. In one embodiment, method 800 is performed by the statistical process monitoring system 105 of FIG. 1.

Referring to FIG. 8, blocks 802 and 804 generally concern a process of fault detection, while blocks 806-816 are concerned with a process of fault diagnosis. In other words, fault diagnosis is a process that may or may not require the user interface to display multiple levels of information in relation to the model metric data related to a sample to allow for fault diagnosis or "drilling down" of information to determine the cause of the fault. At block 802, processing logic presents multivariate model metric data of multiple samples for a user to select. The multivariate model metric data may indicate or represent a fault. In one embodiment, the user interface resembles the display described in FIG. 2 where the values representing multivariate faults are displayed corresponding to multiple samples and each data point is linked to multivariate fault contribution information that can be displayed. A user can visually detect a fault by comparing the multivariate faults of each sample to a predetermined threshold. If a model metric exceeds the threshold level, a multivariate fault is detected.

At Block 804 processing logic receives a user selection of a data point of interest. This data point may or may not relate to a faulty sample. Generally a point is selected if the data point exceeds the threshold level thus indicating a sample is faulty. At block 806, processing logic presents fault contribution information of variables relative to components associated with the variables. The fault contribution information displays the fault contribution of variables. In one embodiment, the contribution information may be displayed in ranges. In another embodiment, the contribution information may be displayed in different colors, different patterns, different shadings, or simply different values. In one embodiment, the display may be similar to what is shown in FIG. 3. In another embodiment, the display may be similar to what is shown in FIG. 4. The display though generally presented in a two dimensional view for easy understanding, may also be presented in a three dimensional view.

At block 808, processing logic receives a user selection of a fault contribution associated with one or more components or variables. At block 810, processing logic presents information about the one or more components related to the selection of fault contribution in response to the user selection of the fault contribution. The information may in one embodiment be displayed in a form similar to that of FIG. 5. In other words, information about variables and its components is linked to the fault contributions which may be displayed by the user interface. At block 812 processing logic receives a user selection of a point or portion of the information of interest about the one or more components related to the fault contribution. At block 814, processing logic presents more in depth information about the one or more components in a variable and remains in a ready mode to display information in response to a user selection of the information presented. In other words, if the process of fault diagnosis requires more in depth information about components in the variable, a user can obtain more in-depth information by further activating the information displayed which is linked to information at a deeper level.

At block 816, processing logic continues to present more in depth information about the one or more components of a variable in response to a user selection until the raw data of the one or more components of the variable is presented. In other words, the process of presenting data and receiving user input iterates until the most basic and raw data has been presented. In one embodiment, the relationship between information displayed in different levels is that a subsequent level of information is more in depth than a previous. In another embodiment, the relationship between information displayed in different levels is that a subsequent level of information is different but related to the previous level of information displayed, but presented in a different perspective to allow a user to distinguish among data. For example, comparing to FIG. 5 which displays the "average chamber throttle valve in step 2" values for all lots, FIG. 6A displays the "average chamber throttle valve in step 2" only for selected slots of samples within the same lot, this shows a different perspective of information. In contrast, FIG. 6B displays the raw values of "chamber throttle vale in step 2" over time, and compares that with other selected samples. This latter example shows a more in depth level of information compared to a previous level, represented by FIG. 5.

Therefore, the user interface aids in fault diagnosis by providing this iterative interactive process with a user to display different and more in depth levels of information which are linked to data presented on the user interface. In other words, block 816 explains that the information drill down process continues from one display to another until the contribution to the fault can be classified and explained or until the information is exhausted where the information displayed is the most basic and can no longer be drilled down any further. It should be appreciated that fault diagnosis may involve analysis of information at multiple levels, unlike fault detection where one level of information is possible for a user to detect fault. Fault diagnosis may require a drill down process to examine relationships of the components in variables and to compare data against other samples and standards. One should appreciate further that drilling down may not necessarily mean obtaining more in depth information, but it should incorporate the exploration of relationships of information with respect to other components, variables, and samples which may be considered lateral instead or in depth information.

Figure 9:
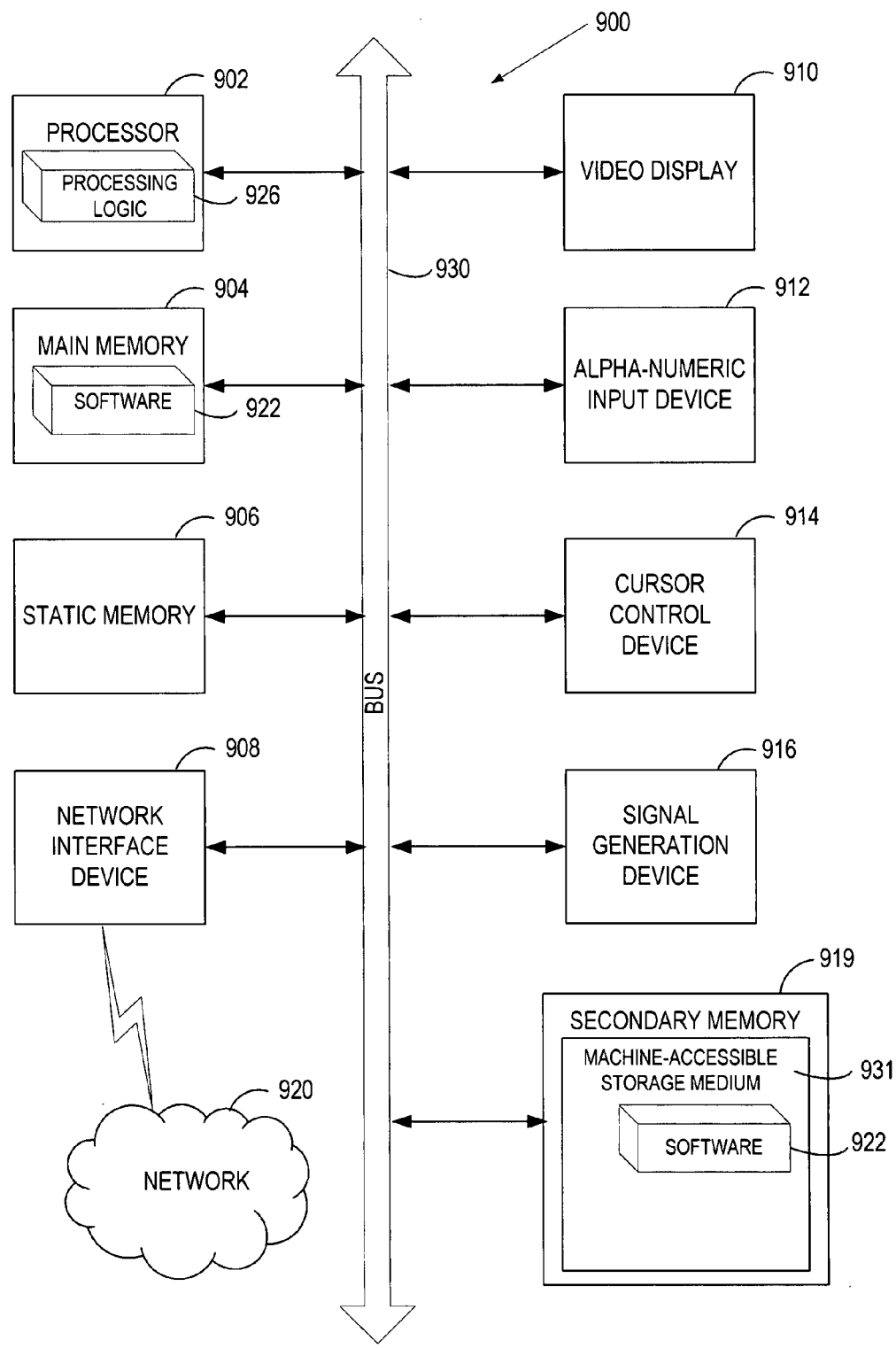
FIG. 9 illustrates a diagrammatic representation of a machine in the exemplary form of a computer system within which a set of instructions, for causing the machine to perform any one or more of the methodologies discussed herein, may be executed, in accordance to an embodiment of the invention.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute the processing logic 929 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 919 (e.g., a speaker).

The data storage device 918 may include a machine-accessible storage medium 931 on which is stored one or more sets of instructions (e.g., software 922) embodying any one or more of the methodologies or functions described herein. The software 922 may also reside, completely or at least partially, within the main memory 904 and/or within the processor 902 during execution thereof by the computer system 900, the main memory 904 and the processor 902 also constituting machine-accessible storage media. The software 922 may further be transmitted or received over a network 920 via the network interface device 908.

The machine-accessible storage medium 931 may also be used to store data structure sets that define user identifying states and user preferences that define user profiles. Data structure sets and user profiles may also be stored in other sections of computer system 900, such as static memory 906.

While the machine-accessible storage medium 931 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
providing a user interface to illustrate a fault for a sample manufactured by a process containing multiple variables, each of the multiple variables comprises at least two components;
presenting in the user interface the multiple variables, one group of components of the multiple variables in a first axis and a second group of components of the multiple variables in a second axis, wherein areas on the user interface where different ones of the one group of components of the multiple variables on the first axis intersect with the different ones of the second group of components of the multiple variables on the second axis are cells;
illustrating, graphically in the user interface, contributions to the fault that are associated with the multiple variables by associating contributions of components in the one group of components of the multiple variables to corresponding components in the second group of components of the multiple variables; and
providing visual indications of fault contributions of components for corresponding cells.

2. The method of claim 1 wherein each of the multiple variables contains same components but representations of each of the components are different for different variables.

3. The method of claim 2 wherein each component include at least one of a sensor, a statistic, and a recipe step.

4. The method of claim 1 wherein each component includes one or more subcomponents.

5. The method of claim 1 wherein each cell is further subdivided.

6. The method of claim 5 wherein each subdivision of the cell further comprises an additional component or subcomponent not represented in the one group of components and the second group of components.

7. The method of claim 1 wherein the user interface is presented in two dimensions or three dimensions.

8. The method of claim 1, wherein providing a visual indication of a fault contribution for each cell comprises the visual indication is provided using at least one of different colors, different symbols, different patterns, different shading, different values or any combination thereof.

9. The method of claim 8 wherein each color is associated with a range defining a level of contribution to the fault.

10. The method of claim 1 wherein each contribution to the fault is in a linear scale.

11. The method of claim 1 wherein each contribution to the fault is in a logarithmic scale.

12. The method of claim 1 wherein each contribution to the fault is in a scale defined by a user including a scale that may be a combination of different scales.

13. The method of claim 1 further comprising:
presenting additional information based on the at least one contribution displayed in the user interface.

14. The method of claim 1 further comprising:
presenting a cause of the fault used for classifying the fault into a fault class and further into a fault signature.

15. The method of claim 14 wherein the fault class is one of many pre-determined causes of the fault.

16. The method of claim 14 wherein the fault signature specifies a ranked list of subset of process variables having greatest statistical contributions to the fault class and is in order of relative magnitudes of respective contributions.

17. The method of claim 14 wherein the fault, after classified, is used to suppress future false alarms with the fault signature.

18. An apparatus, comprising:
means for providing a user interface to illustrate a fault for a sample manufactured by a process containing multiple variables, each of the multiple variables comprises at least two components;
means for presenting in the user interface the multiple variables, one group of components of the multiple variables in a first axis and a second group of components of the multiple variables in a second axis, wherein areas on the user interface where different ones of the one group of components of the multiple variables on the first axis intersect with the different ones of the second group of components of the multiple variables on the second axis are cells;
means for illustrating, graphically in the user interface, contributions to the fault that are associated with the multiple variables by associating contributions of components in the one group of components of the multiple variables to corresponding components in the second group of components of the multiple variables; and
means for providing visual indications of fault contributions of components for corresponding cells.

19. The apparatus of claim 18 wherein each of the multiple variables contains same components but representations of each of the components are different for different variables.

20. The apparatus of claim 19 wherein each component include at least one of a sensor, a statistic, and a recipe step.

21. The apparatus of claim 18, wherein providing a visual indication of a fault contribution for each cell comprises the visual indication is provided using at least one of different colors, different symbols, different patterns, different shading, different values or any combination thereof.

22. The apparatus of claim 21 wherein each color is associated with a range defining a level of contribution to the fault.

23. A machine-accessible medium that provides instructions that, if executed by a machine, will cause the machine to perform operations, comprising:
providing a user interface to illustrate a fault for a sample manufactured by a process containing multiple variables, each of the multiple variables comprises at least two components;
presenting in the user interface the multiple variables, one group of components of the multiple variables in a first axis and a second group of components of the multiple variables in a second axis, wherein areas on the user interface where different ones of the one group of components of the multiple variables on the first axis intersect with the different ones of the second group of components of the multiple variable on the second axis are cells;
illustrating, graphically in the user interface, contributions to the fault that are associated with the multiple variables by associating contributions of components in the one group of components of the multiple variables to corresponding components in the second group of components of the multiple variables; and
providing visual indications of fault contributions of component for corresponding cells.

24. The machine-accessible medium of claim 23 wherein each of the multiple variables contains same components but representations of each of the components are different for different variables.

25. The machine-accessible medium of claim 24 wherein each component include at least one of a sensor, a statistic, and a recipe step.

26. A system comprising:
a database to store data pertaining to faults; and
a GUI generator, coupled with the database, to
provide a user interface to illustrate a fault for a sample manufactured by a process containing multiple variables, each of the multiple variables comprises at least two components,
present in the user interface the multiple variables, one group of components of the multiple variables in a first axis and a second group of components of the multiple variables in a second axis, wherein areas on the user interface where different ones of the group of components of the multiple variables on the first axis intersect with the different ones of the second group of components of the multiple variables on the second axis are cells,
illustrate, graphically in the user interface, contributions to the fault that are associated with the multiple variables by associating contributions of components in the one group of components of the multiple variables to corresponding components in the second group of components of the multiple variables, and
providing visual indications of fault contributions of components for corresponding cells.

* * * * *